US010404123B2

(12) United States Patent
Sheu et al.

(10) Patent No.: US 10,404,123 B2
(45) Date of Patent: Sep. 3, 2019

(54) STATOR

(71) Applicant: DELTA ELECTRONICS, INC., Taoyuan (TW)

(72) Inventors: Hong-Cheng Sheu, Taoyuan (TW); Hsing-Cheng Lin, Taoyuan (TW); Chia-Hsing Chien, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 125 days.

(21) Appl. No.: 15/659,642

(22) Filed: Jul. 26, 2017

(65) Prior Publication Data
US 2018/0152070 A1     May 31, 2018

(30) Foreign Application Priority Data

Nov. 25, 2016   (TW) .................................. 105138814

(51) Int. Cl.
  *H02K 3/04*   (2006.01)
  *H02K 3/28*   (2006.01)
  *H02K 3/12*   (2006.01)
  *H02K 3/34*   (2006.01)

(52) U.S. Cl.
  CPC .................. *H02K 3/28* (2013.01); *H02K 3/12* (2013.01); *H02K 3/34* (2013.01)

(58) Field of Classification Search
  CPC .............. H02K 3/28; H02K 3/12; H02K 3/34
  USPC .................. 310/208, 179–184, 188, 189, 200
  See application file for complete search history.

(56) References Cited

U.S. PATENT DOCUMENTS

| 4,947,900 A | 8/1990 | Veser |
| 5,864,193 A | 1/1999 | Katoh |
| 6,268,668 B1 | 7/2001 | Jarczynski et al. |
| 6,414,410 B1 * | 7/2002 | Nakamura ............... H02K 3/12 |
| | | 310/179 |
| 7,268,456 B2 | 9/2007 | Harada et al. |
| 8,076,817 B2 | 12/2011 | Ciampolini et al. |
| (Continued) | | |

FOREIGN PATENT DOCUMENTS

| CN | 1781232 A | 5/2006 |
| CN | 102904361 A | 1/2013 |
| (Continued) | | |

OTHER PUBLICATIONS

The pertinent parts of US2011260572A1.
(Continued)

*Primary Examiner* — Thanh Lam
(74) *Attorney, Agent, or Firm* — CKC & Partners Co., LLC (57) ABSTRACT

A stator is applied in an electrical motor. The stator includes a hollow iron core and a plurality of coil windings. The hollow iron core has two opposite surfaces and a plurality of accommodating spaces communicated with the surfaces. The accommodating spaces are arranged in an annular pattern. Each of the coil windings includes a plurality of wires winded via the accommodating spaces. Portions of the wires of the coil windings located in the accommodating spaces are radially concentrically arranged to form a plurality of winding layers. In at least one of the accommodating spaces, a wire cross-sectional area of the wire of the innermost one of the winding layers is smaller than a wire cross-sectional area of the wire of the outermost one of the winding layers.

12 Claims, 5 Drawing Sheets

(56) References Cited

U.S. PATENT DOCUMENTS

| | | | |
|---|---|---|---|
| 2005/0062359 A1* | 3/2005 | Neet | H02K 3/493 |
| | | | 310/214 |
| 2005/0258704 A1* | 11/2005 | Oohashi | H02K 3/12 |
| | | | 310/216.069 |
| 2010/0001609 A1 | 1/2010 | Ishigami et al. | |
| 2010/0045134 A1 | 2/2010 | Ciampolini et al. | |
| 2011/0050026 A1 | 3/2011 | Kaiser et al. | |
| 2011/0260572 A1 | 10/2011 | Hiraga et al. | |
| 2012/0274172 A1* | 11/2012 | Koga | H02K 3/12 |
| | | | 310/208 |

FOREIGN PATENT DOCUMENTS

| | | |
|---|---|---|
| EP | 1317047 A2 | 6/2003 |
| EP | 1381140 A2 | 1/2004 |
| EP | 2660956 A1 | 11/2013 |
| JP | 2004-508800 A | 3/2004 |
| JP | 2007-228708 A | 9/2007 |
| JP | 2011234504 A | 11/2011 |
| JP | 2012-223049 A | 11/2012 |
| JP | 2014-090615 A | 5/2014 |
| KR | 10-2013-0075738 A | 7/2013 |
| WO | 2008044703 A1 | 4/2008 |
| WO | 2008080966 A2 | 7/2008 |
| WO | 2016/152785 A | 9/2016 |

OTHER PUBLICATIONS

The pertinent parts of US2010001609A1.
The pertinent parts of US5864193A.
The pertinent parts of US2011050026A1.

\* cited by examiner

STATOR

RELATED APPLICATIONS

This application claims priority to Taiwan Application Serial Number 105138814, filed Nov. 25, 2016, which is herein incorporated by reference.

BACKGROUND

Technical Field

The present disclosure relates to a stator applied in a motor.

Description of Related Art

In a stator applied in an electrical motor, owing to low voltage applications or high power requirements, wires winded in the accommodating troughs typically need sufficient cross-sectional areas to withstand large currents. A conventional approach is adopting plurality of wires having the same cross-sectional area or a single copper wire having a larger cross-sectional area. The single copper wire has the advantage of high space factor, but the AC loss of the copper wire will rapidly increase with the increase of the rotating speed of the motor due to the skin effect and the proximity effect. To solve the problem, a common approach is adopting plurality of copper wires having smaller cross-sectional areas, so as to decrease the AC loss. However, the approach will cause the space factor to drop and reduce the effective cross-sectional areas of the copper wires to cause the DC resistance to increase, such that the overall loss of the wires will increase.

SUMMARY

An aspect of the disclosure is to provide a stator winding structure which can decrease the AC loss of copper wires and has a smaller influence to the overall loss of the wires.

According to an embodiment of the disclosure, a stator is applied in an electrical motor. The stator includes a hollow iron core and a plurality of coil windings. The hollow iron core has two opposite surfaces and a plurality of accommodating spaces communicated with the surfaces. The accommodating spaces are arranged in an annular pattern. Each of the coil windings includes a plurality of wires winded via the accommodating spaces. Portions of the wires of the coil windings located in the accommodating spaces are radially concentrically arranged to form a plurality of winding layers. In at least one of the accommodating spaces, a wire cross-sectional area of the wire of the innermost one of the winding layers is smaller than a wire cross-sectional area of the wire of the outermost one of the winding layers.

In an embodiment of the disclosure, in at least one of the accommodating spaces, a wire cross-sectional area of the wire of one of the winding layers arranged proximal to an inner side is smaller than a wire cross-sectional area of the wire of one of the winding layers arranged proximal to an outer side.

In an embodiment of the disclosure, the winding layers are arranged from an outer side to an inner side in at least six layers.

In an embodiment of the disclosure, in at least one of the accommodating spaces, a wire cross-sectional area of the wire of the fifth layer of the winding layers is greater than or equal to a wire cross-sectional area of the wire of the sixth layer of the winding layers.

In an embodiment of the disclosure, in at least one of the accommodating spaces, a sum of wire cross-sectional areas of the wires of the third and fourth layers of the winding layers is greater than or equal to a sum of wire cross-sectional areas of the wires of the fifth and sixth layers of the winding layers.

In an embodiment of the disclosure, in at least one of the accommodating spaces, a wire cross-sectional area of the wire of the second layer of the winding layers is greater than a wire cross-sectional area of at least one of the wires of the third to sixth layers of the winding layers.

In an embodiment of the disclosure, in at least one of the accommodating spaces, a wire cross-sectional area of the wire of the first layer of the winding layers is greater than or equal to a wire cross-sectional area of the wire of the second layer of the winding layers.

In an embodiment of the disclosure, the coil windings include a first coil winding, a second coil winding, and a third coil winding. The first coil winding is constituted by the first and second layers of the winding layers. The second coil winding is constituted by the third and fifth layers of the winding layers. The third coil winding is constituted by the fourth and sixth layers of the winding layers.

In an embodiment of the disclosure, at least one of the wires of the second coil winding and at least one of the wires of the third coil winding are connected in parallel.

In an embodiment of the disclosure, at least one of the wires of the second coil winding and at least one of the wires of the first coil winding are connected in series, or at least one of the wires of the third coil winding and at least one of the wires of the first coil winding are connected in series.

In an embodiment of the disclosure, in at least one of the accommodating spaces, the wires of the first coil winding are separated from the wires of the second coil winding by a first insulating layer.

In an embodiment of the disclosure, in at least one of the accommodating spaces, the wires of the second coil winding are separated from the wires of the third coil winding by a second insulating layer. An insulation class of the first insulating layer is greater than an insulation class of the second insulating layer.

Accordingly, the stator of the present disclosure has a design that the wire cross-sectional area of the wire of the innermost one of the winding layers is smaller than the wire cross-sectional area of the wire of the outermost one of the winding layers. Under the influence of the proximity effect, the AC loss of the innermost winding layer is greater than that of the outermost winding layer. Hence, by adjusting the wire cross-sectional areas using the foregoing design, the AC loss of the stator can be effectively reduced, and the space factor will not decrease and the DC loss will not increase while adopting the copper wires having a smaller and the same cross-sectional area, so as to make the stator achieve the purpose of decreasing the influence of the proximity effect and overall loss.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
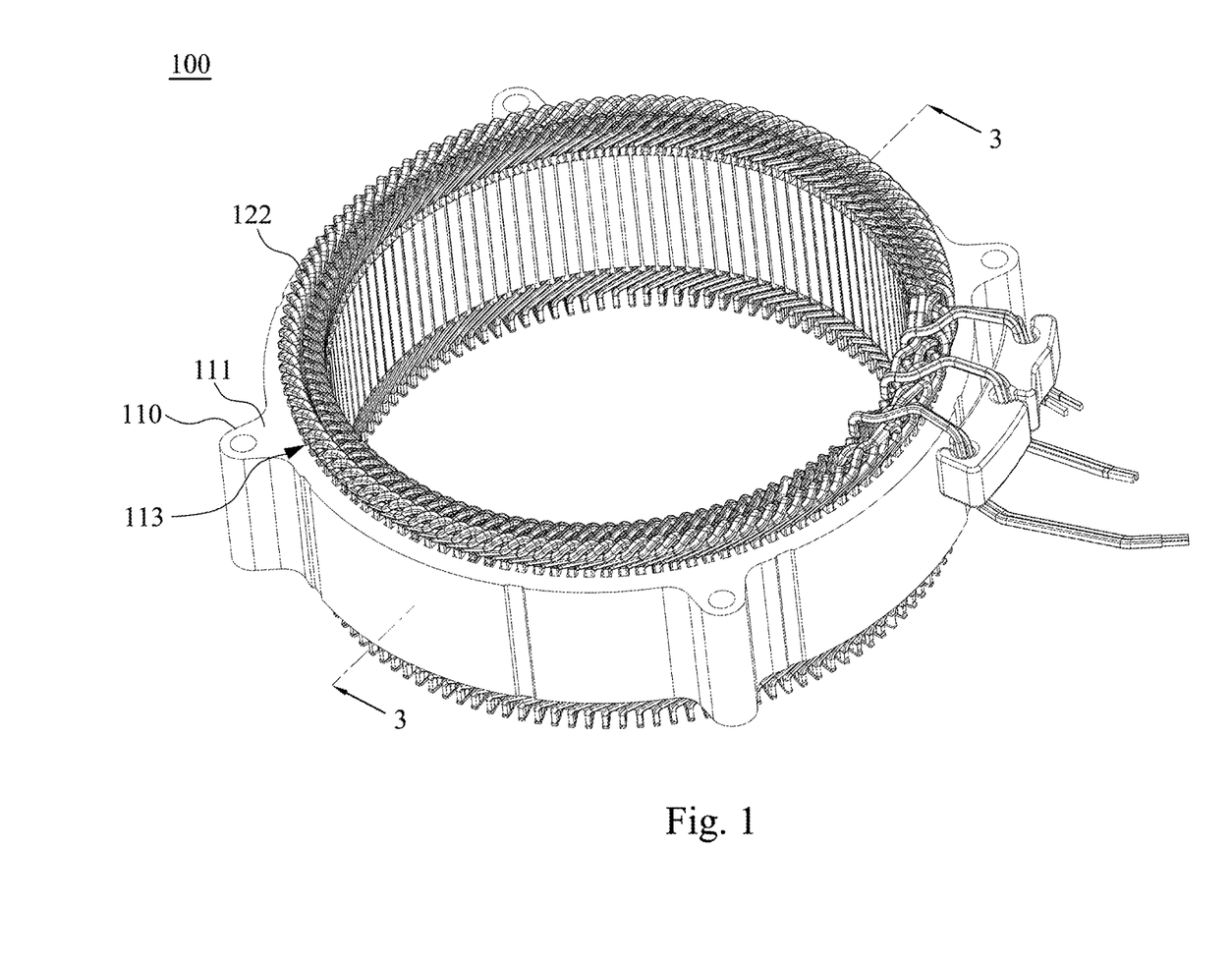
FIG. 1 is a perspective view of a stator according to an embodiment of the disclosure.
Figure 2:
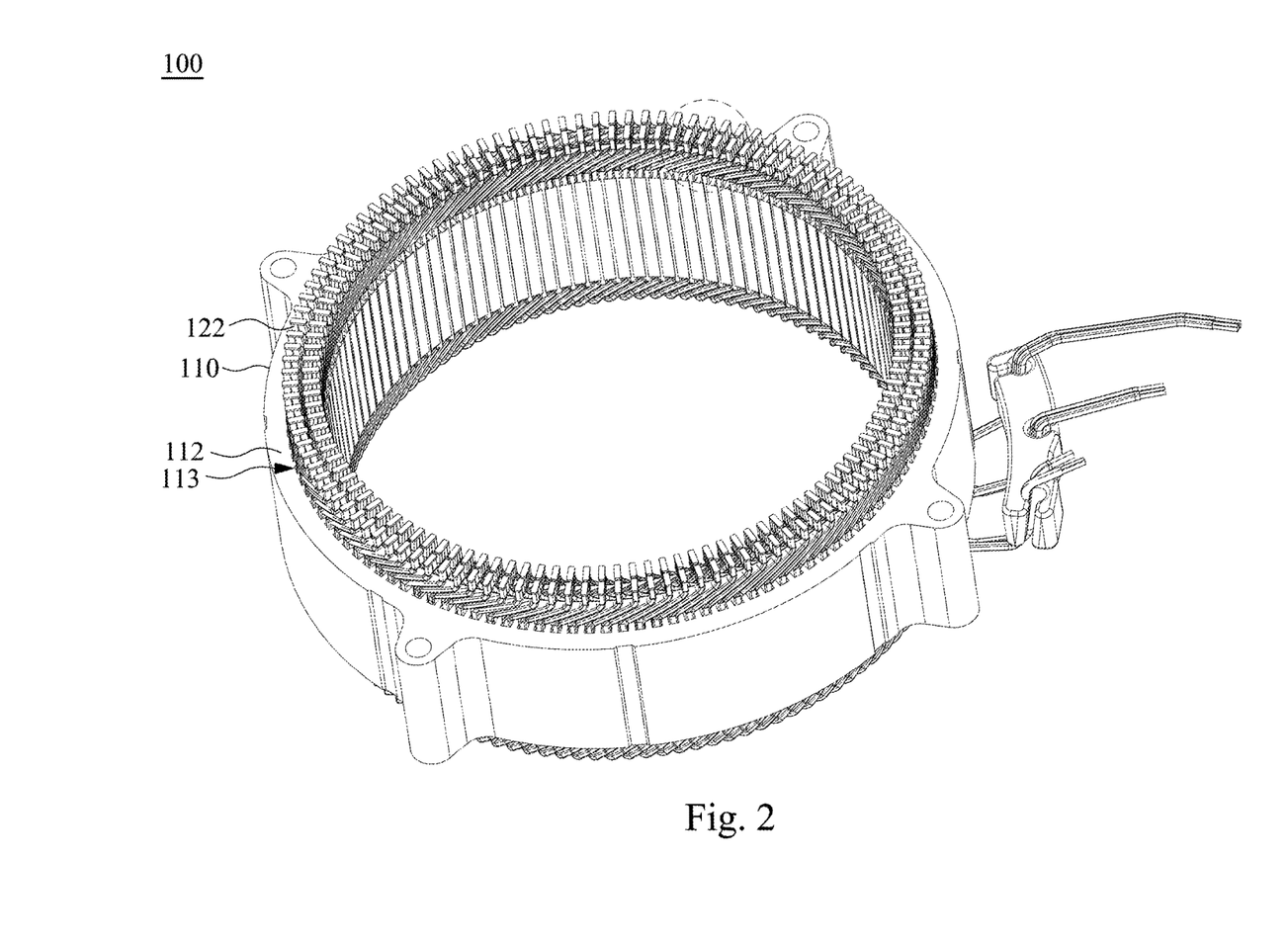
FIG. 2 is another perspective view of the stator shown in FIG. 1.
Figure 3:
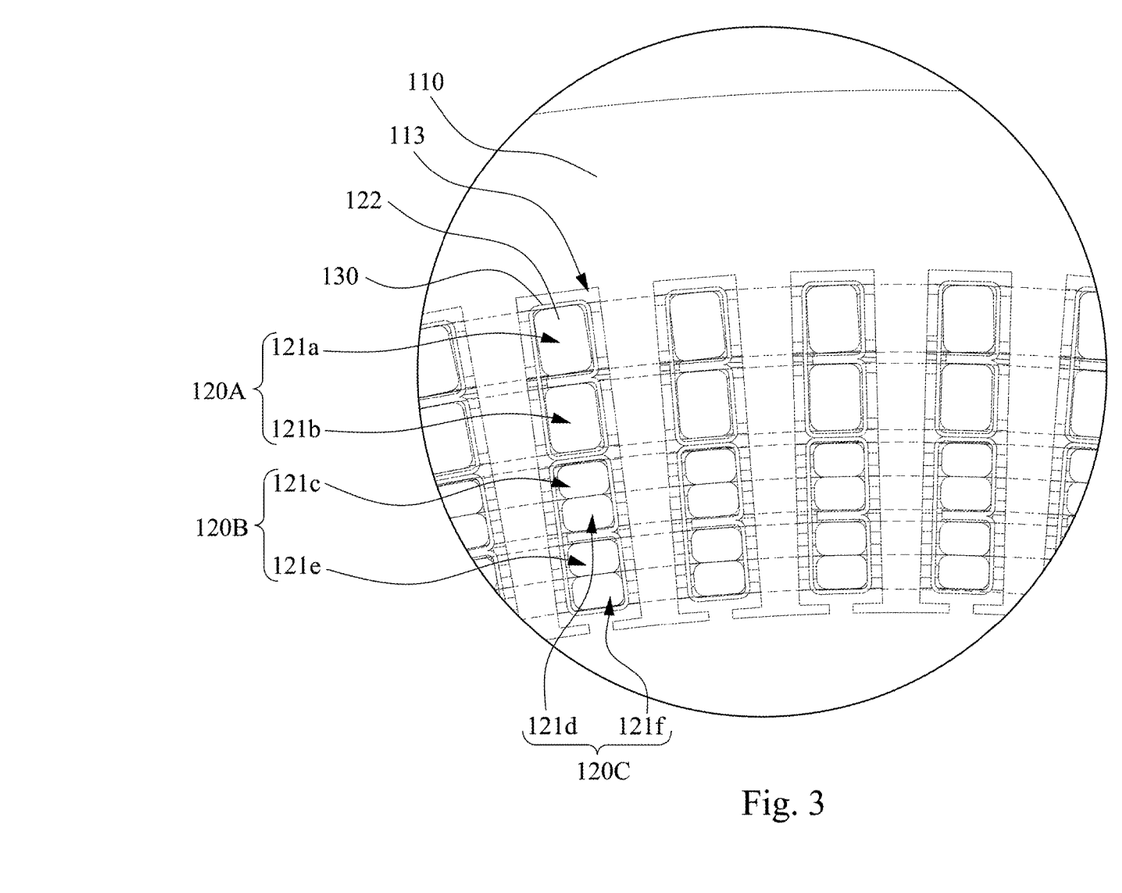
FIG. 3 is a partial cross-sectional view of the stator shown in FIG. 1 taken along line 3-3.

Reference is made to FIGS. 1 to 3. FIG. 1 is a perspective view of a stator 100 according to an embodiment of the disclosure. FIG. 2 is another perspective view of the stator 100 shown in FIG. 1. FIG. 3 is a partial cross-sectional view of the stator 100 shown in FIG. 1 taken along line 3-3.

As shown in FIGS. 1 and 2, in the embodiment, the stator 100 can be applied in an electrical motor. The stator 100 includes a hollow iron core 110 and a plurality of coil windings. The hollow iron core 110 has a first surface 111 (referring to FIG. 1), a second surface 112, and a plurality of accommodating spaces 113. The first surface 111 and the second surface 112 are respectively located at opposite side of the hollow iron core 110. Each of the accommodating spaces 113 is communicated with the first surface 111 and the second surface 112. That is, each of the accommodating spaces 113 runs through the hollow iron core 110. The accommodating spaces 113 are arranged in an annular pattern. Each of the coil windings includes a plurality of wires 122 winded via the accommodating spaces 113. In the embodiment, the accommodating spaces 113 are not communicated to the inner wall of the hollow iron core 110 in radical directions, but the disclosure is not limited in this regard. In practical applications, the accommodating spaces 113 can be entirely or partially communicated to the inner wall of the hollow iron core 110 in radical directions.

As shown in FIG. 3, portions of the wires 122 of the coil windings located in the accommodating spaces are concentrically arranged to form a plurality of winding layers 121a, 121b, 121c, 121d, 121e, 121f. In the embodiment, the winding layers 121a, 121b, 121c, 121d, 121e, 121f are arranged from an outer side to an inner side of the hollow iron core 110, but the number of the winding layers is not limited in this regard.

Specifically, in the embodiment, in at least one of the accommodating spaces 113, a wire cross-sectional area of the wire 122 of the innermost winding layer 121f is smaller than a wire cross-sectional area of the wire 122 of the outermost winding layer 121a. Under the influence of the proximity effect, the AC loss of the innermost winding layer 121f is greater than that of the outermost winding layer 121a. Hence, by adjusting the wire cross-sectional areas in the manner described above, the AC loss of the stator 100 can be effectively reduced, and the space factor (i.e., the ratio of the volume occupied by the wire 122 therein) will not decrease and the DC loss will not increase while adopting the wires (e.g., copper wires) having a smaller and the same cross-sectional area, so as to make the stator 100 achieve the purpose of decreasing the influence of the proximity effect and overall loss.

In some embodiments, each of the wires 122 has two parts. The two parts are respectively winded in corresponding two of the accommodating spaces 113 and belonged to corresponding two of the winding layers 121a, 121b, 121c, 121d, 121e, 121f. For example, the parts of each of the wires 122 can across six accommodating spaces 113, but the disclosure is not limited in this regard and can be flexibly adjusted as needed.

As shown in FIG. 3, in the embodiment, in at least one of the accommodating spaces 113, a wire cross-sectional area of the wire 122 of one of the winding layers 121a, 121b, 121c, 121d, 121e, 121f arranged proximal to the inner side is smaller than a wire cross-sectional area of the wire 122 of one of the winding layers 121a, 121b, 121c, 121d, 121e, 121f arranged proximal to the outer side, such that the foregoing purpose of decreasing the influence of the proximity effect and overall loss can also be achieved. For example, in some embodiments, in at least one of the accommodating spaces 113, a wire cross-sectional area of the wire 122 of the fifth winding layer 121e is greater than or equal to a wire cross-sectional area of the wire 122 of the sixth winding layer 121f.

Alternatively, in some embodiments, in at least one of the accommodating spaces 113, a sum of wire cross-sectional areas of the wires 122 of the third and fourth winding layers 121c, 121d is greater than or equal to a sum of wire cross-sectional areas of the wires of the fifth and sixth winding layers 121e, 121f.

Alternatively, in some embodiments, in at least one of the accommodating spaces 113, a wire cross-sectional area of the wires 122 of the second winding layer 121b is greater than a wire cross-sectional areas of the wire 122 of at least one of the third, fourth, fifth, and sixth winding layers 121c, 121d, 121e, 121f.

Alternatively, in some embodiments, in at least one of the accommodating spaces 113, a wire cross-sectional area of the wire 122 of the first winding layer 121a is greater than or equal to a wire cross-sectional area of the wire 122 of the second winding layer 121b.

As shown in FIG. 3, the first and second winding layers 121a, 121b constitute a first coil winding 120A. The third and fifth winding layers 121c, 121e constitute a second coil winding 120B. The fourth and sixth layers of the winding layers 121d, 121f constitute a third coil winding 120C.

In addition, the stator 100 of the embodiment further includes a first insulating layer 130 (referring to FIGS. 3 and 4) disposed in the accommodating spaces 113. In at least one of the accommodating spaces 113, the wires 122 of the first coil winding 120A are separated from the wires 122 of the second coil winding 120B by the first insulating layer 130. Specifically, the wire 122 arranged in the second winding layer 121b are separated from the wire 122 arranged in the third winding layer 121c by the first insulating layer 130. Furthermore, in at least one of the accommodating spaces 113, the wires 122 of the second coil winding 121B are separated from the wires 122 of the third coil winding 121C by a second insulating layer 140 (referring to FIG. 4).

Figure 4:
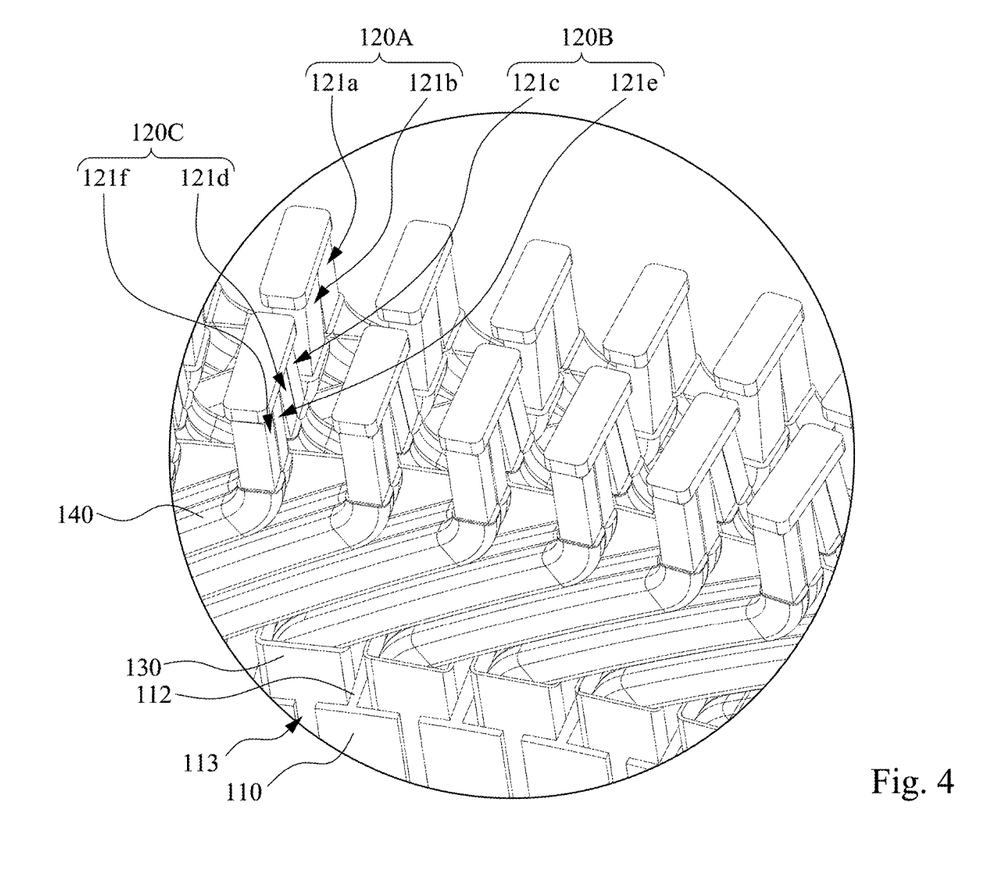
FIG. 4 is a partial enlarged view of FIG. 2.

In practical applications, such as an application of short pitch (relative to full pitch), there may be different phases in the same accommodating space 113 and thus has a large voltage difference, so the insulation class of the adopted first insulating layer 130 can be larger, and the insulation class of the adopted second insulating layer 140 can be smaller. For example, in some embodiments, the first insulating layer 130 can be insulating paper or plastic, but the disclosure is not limited in this regard. In some embodiments, the second insulating layer 140 can be paint or coating formed on outer surfaces of the wires 122 of the third to sixth winding layers 121c, 121d, 121e, 121f, but the disclosure is not limited in this regard.

Figure 5:
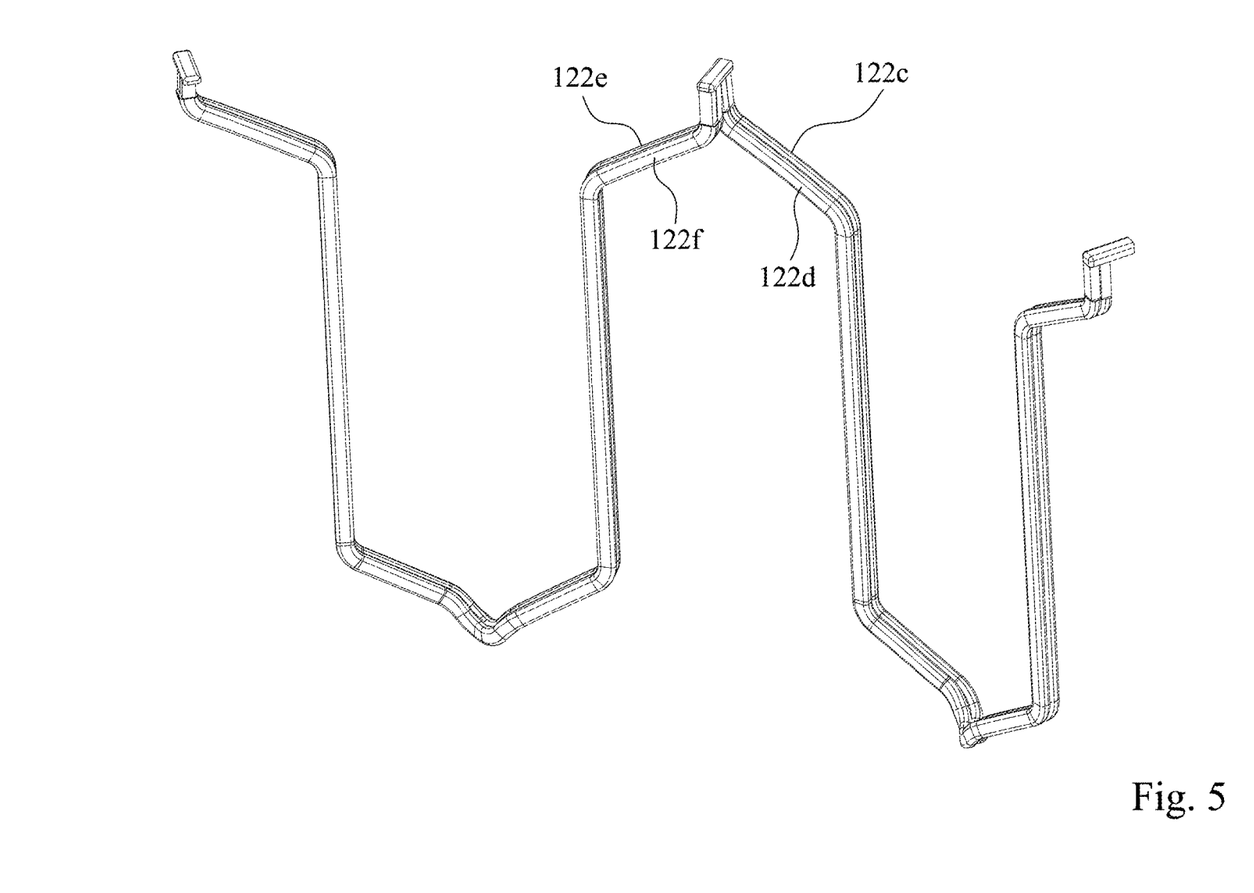
FIG. 5 is a perspective view of some wires winded in the accommodating spaces shown in FIG. 4.

Reference is made to FIGS. 4 and 5. FIG. 4 is a partial enlarged view of FIG. 2. FIG. 5 is a perspective view of some wires winded in the accommodating spaces 113 shown in FIG. 4. As shown in FIG. 5, in the embodiment, wires 122c, 122d form two V-shaped structures arranged side by side at the right side, and wires 122e, 122f form two V-shaped structures arranged side by side at the left side. Specifically, the wires 122c, 122e (forming a W-shaped structure) are parts of the second coil winding 120B, so two parts of any of the wires 122c, 122e winded in two accommodating spaces 113 are respectively belonged to third and fifth winding layers 121c, 121e. The wires 122d, 122f (forming another W-shaped structure) are parts of the third coil winding 120C, so two parts of any of the wires 122d, 122f winded in two accommodating spaces 113 are respectively belonged to fourth and sixth winding layers 121d, 121f.

Furthermore, as shown in FIG. 5, the wire 122c of the second coil winding 120B and the wire 122d of the third coil winding 120C (i.e., the V-shaped structures at the right side) are connected in parallel, the wire 122e of the second coil winding 120B and the wire 122f of the third coil winding 120C (i.e., the V-shaped structures at the left side) are connected in parallel, and the V-shaped structures at the right side and the V-shaped structures at the left side are connected in series.

In some embodiments, at least one wire of the second coil winding 120B or at least one wire of the third coil winding 120C can be further connected to at least one wire of the first coil winding 120A in series (e.g., via a jumper wire).

In practical applications, the stator 100 of the present disclosure is not limited to include three coil windings and can be flexibly adjusted as needed. For example, the stator 100 of the present disclosure can further include at least one additional coil winding. For example, a fourth coil winding (not shown) can be winded between the second coil winding 120B and the third coil winding 120C and connected in parallel with each other, and then these three coil windings are connected to the first coil winding 120A in series. The wires 122 of the first coil winding 120A to the fourth coil winding can be rearranged from outer side to the inner side in eight winding layers, in which the first and second winding layers constitute the first coil winding 120A, the third and sixth winding layers constitute the second coil winding 120B, the fourth and seventh layers of the winding layers constitute the third coil winding 120C, and the fifth and eighth layers of the winding layers constitute the fourth coil winding. Under the structural configuration, the foregoing purpose of decreasing the influence of the proximity effect and overall loss can also be achieved as long as the requirement that the wire cross-sectional area of any wire 122 of one of the winding layers arranged proximal to the inner side is smaller than the wire cross-sectional area of any wires 122 of one of the winding layers arranged proximal to the outer side is met.

According to the foregoing recitations of the embodiments of the disclosure, it can be seen that the stator of the present disclosure has a design that the wire cross-sectional area of the wire of the innermost one of the winding layers is smaller than the wire cross-sectional area of the wire of the outermost one of the winding layers. Under the influence of the proximity effect, the AC loss of the innermost winding layer is greater than that of the outermost winding layer. Hence, by adjusting the wire cross-sectional areas using the foregoing design, the AC loss of the stator can be effectively reduced, and the space factor will not decrease and the DC loss will not increase while adopting the copper wires having a smaller and the same cross-sectional area, so as to make the stator achieve the purpose of decreasing the influence of the proximity effect and overall loss.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stator applied in an electrical motor, the stator comprising:
    a hollow iron core, having two opposite surfaces and a plurality of accommodating spaces communicated with the surfaces, the accommodating spaces being arranged in an annular pattern; and
    a plurality of coil windings, each of the coil windings comprising a plurality of wires winded via the accommodating spaces, portions of the wires of the coil windings located in the accommodating spaces being radially concentrically arranged to form a plurality of winding layers, wherein in at least one of the accommodating spaces, a wire cross-sectional area of the wire of the innermost one of the winding layers is smaller than a wire cross-sectional area of the wire of the outermost one of the winding layers.

2. The stator of claim 1, wherein in at least one of the accommodating spaces, a wire cross-sectional area of the wire of one of the winding layers arranged proximal to an inner side is smaller than a wire cross-sectional area of the wire of one of the winding layers arranged proximal to an outer side.

3. The stator of claim 1, wherein the winding layers are arranged from an outer side to an inner side in at least six layers.

4. The stator of claim 3, wherein in at least one of the accommodating spaces, a wire cross-sectional area of the wire of the fifth layer of the winding layers is greater than or equal to a wire cross-sectional area of the wire of the sixth layer of the winding layers.

5. The stator of claim 3, wherein in at least one of the accommodating spaces, a sum of wire cross-sectional areas of the wires of the third and fourth layers of the winding layers is greater than or equal to a sum of wire cross-sectional areas of the wires of the fifth and sixth layers of the winding layers.

6. The stator of claim 3, wherein in at least one of the accommodating spaces, a wire cross-sectional area of the wire of the second layer of the winding layers is greater than a wire cross-sectional area of at least one of the wires of the third to sixth layers of the winding layers.

7. The stator of claim 3, wherein in at least one of the accommodating spaces, a wire cross-sectional area of the wire of the first layer of the winding layers is greater than or equal to a wire cross-sectional area of the wire of the second layer of the winding layers.

8. The stator of claim 3, wherein the coil windings comprises a first coil winding, a second coil winding, and a third coil winding, the first coil winding is constituted by the first and second layers of the winding layers, the second coil winding is constituted by the third and fifth layers of the winding layers, and the third coil winding is constituted by the fourth and sixth layers of the winding layers.

9. The stator of claim 8, wherein at least one of the wires of the second coil winding and at least one of the wires of the third coil winding are connected in parallel.

10. The stator of claim 9, wherein at least one of the wires of the second coil winding and at least one of the wires of the first coil winding are connected in series, or at least one of the wires of the third coil winding and at least one of the wires of the first coil winding are connected in series.

11. The stator of claim 8, wherein in at least one of the accommodating spaces, the wires of the first coil winding are separated from the wires of the second coil winding by a first insulating layer.

12. The stator of claim 11, wherein in at least one of the accommodating spaces, the wires of the second coil winding are separated from the wires of the third coil winding by a second insulating layer, and an insulation class of the first insulating layer is greater than an insulation class of the second insulating layer.

* * * * *